United States Patent
Otobe et al.

(10) Patent No.: US 9,206,319 B2
(45) Date of Patent: Dec. 8, 2015

(54) WEAR-RESISTANT COBALT-BASED ALLOY AND ENGINE VALVE COATED WITH SAME

(75) Inventors: Katsunori Otobe, Kyoto (JP); Shinichi Nishimura, Kyoto (JP); Kazunori Kurahashi, Hadano (JP)

(73) Assignees: Fukuda Metal Foil & Powder Co., Ltd., Kyoto (JP); Nittan Valve Co., Ltd., Hadano-shi, Kanagawa (JP)

( * ) Notice: Subject to any disclaimer, the term of this patent is extended or adjusted under 35 U.S.C. 154(b) by 0 days.

(21) Appl. No.: 13/881,346

(22) PCT Filed: May 23, 2011

(86) PCT No.: PCT/JP2011/061748
§ 371 (c)(1),
(2), (4) Date: Apr. 24, 2013

(87) PCT Pub. No.: WO2012/063512
PCT Pub. Date: May 18, 2012

(65) Prior Publication Data
US 2013/0221261 A1    Aug. 29, 2013

(30) Foreign Application Priority Data

Nov. 9, 2010 (JP) .................................. 2010-250598

(51) Int. Cl.
*B32B 15/00* (2006.01)
*C09D 1/00* (2006.01)
*B23K 10/02* (2006.01)
(Continued)

(52) U.S. Cl.
CPC ................. *C09D 1/00* (2013.01); *B23K 10/027* (2013.01); *B23K 35/30* (2013.01); *C22C 1/02* (2013.01); *C22C 19/07* (2013.01); *C22F 1/08* (2013.01); *C23C 30/00* (2013.01); *F01L 3/04* (2013.01); *F16K 51/00* (2013.01); *B23K 2201/003* (2013.01); *F01L 2101/00* (2013.01); *F01L 2103/00* (2013.01); *F01L 2103/01* (2013.01);

(Continued)

(58) Field of Classification Search
None
See application file for complete search history.

(56) References Cited

U.S. PATENT DOCUMENTS 2,097,177 A * 10/1937 De Golyer .................... 148/408
3,313,633 A * 4/1967 Longo .......................... 106/1.05
(Continued)

FOREIGN PATENT DOCUMENTS

EP    0 509 910 A1    10/1992
GB      907355         10/1962
(Continued)

OTHER PUBLICATIONS

B.G. Liptak (editor), 1999, Engineer's Handbook, vol. 2, 3rd Edition, "Process Control" p. 470.*

(Continued)

*Primary Examiner* — Humera Sheikh
*Assistant Examiner* — Seth Dumbris
(74) *Attorney, Agent, or Firm* — Muncy, Geissler, Olds & Lowe, P.C.

(57) ABSTRACT

A surface hardening material being excellent in abrasion resistance and having impact resistance is provided. Provided are: a wear-resistant cobalt-based alloy containing 20.0 to 30.0 mass % of a sum of Mo and/or W, 0.8 to 2.2 mass % of B, 5.0 to 18.0 mass % of Cr, 5.0 mass % or less of a sum of Fe, Ni, Mn, Cu, Si and C, 1.0 mass % or less of Si, and 0.3 mass % or less of C, and the remainder comprising 55.0 to 70.0 mass % of Co and unavoidable impurities; and an engine valve coated with the same.

13 Claims, 1 Drawing Sheet

(51) Int. Cl.

| | | |
|---|---|---|
| *B23K 35/30* | (2006.01) | |
| *C22C 19/07* | (2006.01) | |
| *F01L 3/04* | (2006.01) | |
| *C23C 30/00* | (2006.01) | |
| *F16K 51/00* | (2006.01) | |
| *C22F 1/08* | (2006.01) | |
| *C22C 1/02* | (2006.01) | |

(52) U.S. Cl.
CPC .......... *F01L 2800/18* (2013.01); *F01L 2820/01* (2013.01)

(56) References Cited

U.S. PATENT DOCUMENTS

| | | | | |
|---|---|---|---|---|
| 3,410,732 | A | * 11/1968 | Smith | 148/425 |
| 4,260,666 | A | 4/1981 | DeCristofaro et al. | |
| 4,325,994 | A | * 4/1982 | Kitashima et al. | 427/376.8 |
| 4,659,632 | A | 4/1987 | Morikawa et al. | |
| 4,692,305 | A | * 9/1987 | Rangaswamy et al. | 420/436 |
| 4,765,955 | A | 8/1988 | Yabuki et al. | |
| 5,238,481 | A | * 8/1993 | Takagi et al. | 75/244 |
| 6,479,014 | B1 | 11/2002 | Wu et al. | |
| 2004/0057863 | A1 | 3/2004 | Wu et al. | |
| 2005/0142026 | A1 | 6/2005 | Wu et al. | |
| 2006/0210826 | A1 | 9/2006 | Wu et al. | |

FOREIGN PATENT DOCUMENTS

| | | | | |
|---|---|---|---|---|
| GB | 2005302 | A | 4/1979 | |
| JP | 56-4396 | A | 1/1981 | |
| JP | 56-69343 | A | 6/1981 | |
| JP | 59-129746 | A | 7/1984 | |
| JP | 59-211546 | | 11/1984 | |
| JP | 59211546 | * | 11/1984 | ............. C22C 19/07 |
| JP | 1-272738 | A | 10/1989 | |
| JP | A-04-107235 | | 4/1992 | |
| JP | 04-254541 | * | 9/1992 | ............. C22C 19/07 |
| JP | 4-254541 | A | 9/1992 | |
| JP | A-05-131289 | | 5/1993 | |
| JP | 6-17176 | A | 1/1994 | |
| JP | 7-68609 | A | 3/1995 | |
| JP | A-07-278780 | | 10/1995 | |
| JP | A-09-296241 | | 11/1997 | |
| JP | A-2001-123238 | | 5/2001 | |
| JP | 2007-111712 | | 5/2007 | |
| JP | A-2008-522039 | | 6/2008 | |
| WO | WO2004/009860 | | 1/2004 | |
| WO | WO 2006/060434 | | 6/2006 | |

OTHER PUBLICATIONS

European Search Report for European Application No. 11839999.7 dated Apr. 15, 2014—English translation.

European Search Report for European Application No. 11840107.4 dated Mar. 27, 2014—English translation.

Wang et al., "Cobalt based alloy and overlay welding for valve," pp. 12-17 (Feb. 2004) including English abstract.

* cited by examiner

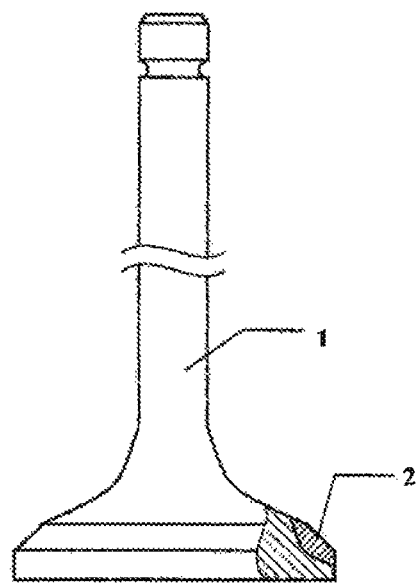

WEAR-RESISTANT COBALT-BASED ALLOY AND ENGINE VALVE COATED WITH SAME

This application is a national stage of International Application No.: PCT/JP2011/061748, which was filed on May 23, 2011, and which claims priority to JP2010-250598, which was filed on Nov. 9, 2010, and which are both herein incorporated by reference.

TECHNICAL FIELD

The present invention relates a surface hardening material used in various construction processes such as PTA powder overlay welding, TIG overlay welding, and thermal spraying, and more particularly to a wear-resistant cobalt-based alloy used in a member that demands an abrasion resistance and to an engine valve coated with the same.

BACKGROUND ART

Conventionally, in an engine valve, a Co—Cr—W—C type material represented by Stellite (registered trademark) (including patent documents 1, 2) and a Co—Mo—Si type material represented by Tribaloy (registered trademark) (including patent documents 3 to 7) are used, and particularly Tribaloy is used in a member that demands an abrasion resistance.

The Co—Cr—W—C type material has an insufficient abrasion resistance though having a high toughness as a surface hardening material, so that the material cannot withstand use for a long period of time. Also, the Co—Mo—Si type material has an insufficient impact resistance though having a high abrasion resistance as a surface hardening material, so that problems such as cracks and exfoliation accompanied thereby are raised.

PRIOR ART DOCUMENTS

Patent Documents

Patent Document 1: JP-A-2001-123238
Patent Document 2: JP-A-2008-522039
Patent Document 3: Japanese Patent No. 4463763
Patent Document 4: JP-A-05-131289
Patent Document 5: JP-A-09-296241
Patent Document 6: JP-A-07-278780
Patent Document 7: JP-A-04-107235

DISCLOSURE OF THE INVENTION

Problems to be Solved by the Invention

Surface hardening aiming at abrasion resistance or impact resistance is currently used widely in various fields of industry. However, due to an improvement in recent years in the consciousness to the environment, there is an increasing severity in the environment for use of industrial apparatus. In accompaniment therewith, surface hardening material is requested to have a higher performance. In particular, in a filling material used in an engine valve, development of a surface hardening material being excellent in abrasion resistance and having impact resistance is demanded.

Means for Solving the Problems

In the present invention, in a study of an alloy composition far developing a surface hardening material excellent in abrasion resistance, the following target values have been set, and the conditions have been set to satisfy all of these.
(Target Value)
(1) Charpy impact value→5 $J/cm^2$ or more
(2) Hardness→52 HRC or more
(3) Overlaying workability→the fluidity of a molten pool formed at the time of overlay welding is good
(4) Thermal impact value→cracks or exfoliation is not generated until 600° C.

In other words, a wear-resistant cobalt-based alloy of the present invention that satisfies the above targets (1) to (4) contains 20.0 to 30.0 mass % of a sum of Mo and/or W, 0.8 to 2.2 mass of B, 5.0 to 18.0 mass % of Cr, wherein the remainder comprises 55.0 to 70.0 mass % of Co and unavoidable impurities. Here, the unavoidable impurities are impurities that are mingled unavoidably in the steps of producing each material and the like, though not intentionally added. Such impurities include, for example, Mg, S, O, N, V, Zr, Sn, and the like, and the total sum of these is typically 0.3 mass % or less, which is of a degree that does not affect the function of the present invention.

Also, a wear-resistant cobalt-based alloy of the present invention contains 20.0 to 30.0 mass % of a sum of Mo and/or W, 0.8 to 2.2 mass % of B, 5.0 to 18.0 mass % of Cr, and further contains 5.0 mass % or less of a sum of Fe, Ni, Mn, Cu, Si and C, 1.0 mass % or less of Si, and 0.3 mass % or less of C, wherein the remainder comprises 55.0 to 70.0 mass % of Co and unavoidable impurities.

Also, an engine valve of the present invention is filled or coated with a wear-resistant cobalt-based alloy having the aforesaid composition. A more preferable engine valve is such that at least a face surface abutting against a sheet is filled or coated with the aforesaid wear-resistant cobalt-based alloy.

Next, the reason why the range of each component of the cobalt-based alloy pertaining to the present invention alloy is limited will be described.

Mo and W impart abrasion resistance and impact resistance by being dissolved into a Co solid solution which serves as a substrate (matrix), and part thereof forms an intermetallic compound with B, thereby further contributing to improvement in the abrasion resistance. However, when the sum amount of Mo and W is less than 20.0 mass %, the solid solution reinforcement is insufficient. When the sum amount exceeds 30.0 mass %, the intermetallic compound is formed in a large amount, thereby greatly lowering the toughness (impact resistance). For this reason, the sum amount of Mo and/or W has been set to be within a range of 20.0 to 30.0 mass %.

B imparts abrasion resistance by forming an intermetallic compound with Cr or Mo, and cleans the molten metal to improve the fluidity at the time of filling, thereby improving the construction workability such as PTA, TIG overlaying, or thermal spraying. However, when the content is less than 0.8 mass %, a sufficient amount of intermetallic compound is not formed, so that the abrasion property is lowered, and moreover, the function of cleaning the molten metal is insufficient. Further, when the content exceeds 2.2 mass %, the intermetallic compound is large in amount, thereby greatly lowering the toughness (impact resistance). For this reason, the content of B has been set to be within a range of 0.8 to 2.2 mass %.

Cr imparts abrasion resistance, impact resistance, corrosion resistance, and oxidation resistance by being dissolved into a Co solid solution. Also, part of Cr forms an intermetallic compound with B so as to be dispersed in the matrix, thereby further contributing to improvement in the abrasion resistance. However, when the content of Cr is less than 5.0 mass %, sufficient abrasion resistance, corrosion resistance, and oxidation resistance cannot be obtained. When the content exceeds 18.0 mass %, the intermetallic compound is formed in a large amount in the metal tissue, thereby greatly lowering the toughness. Therefore, the range of the content has been set to be 5.0 to 18.0 mass %.

The cobalt-based alloy of the present invention can further contain 5.0 mass % or less of a sum of Fe, Ni, Mn, Cu, Si and C, 1.0 mass % or less of Si, and 0.3 mass % or less of C as added elements that do not give adverse effects on the physical properties.

Effect of the Invention

The cobalt-based alloy of the present invention has characteristics of a Charpy impact value of 5 J/cm$^2$ or more and a hardness of 52 HRC or more, has a good PTA overlaying workability, and does not generate cracks or exfoliation until 600° C. in a thermal impact test of an overlay test piece, so that the alloy can be applied to a wide range of use as a surface hardening material having excellent abrasion resistance and impact resistance.

BRIEF DESCRIPTION OF THE DRAWINGS

FIG. 1 is a schematic view in one example of an engine valve coated with a wear-resistant cobalt-based alloy of the present invention.

MODE FOR CARRYING OUT THE INVENTION

The cobalt-based alloy of the present invention can be obtained by heating and melting an ingot, in which Co as a base, Mo and/or W, Cr, and B as added components, and Fe, Si, Mn, Cu, Ni and C added in accordance with the needs are each adjusted and blended to have a predetermined mass %, in a crucible within a melting furnace so as to form an alloy in a liquid form, and thereafter transforming the molten alloy into a powder by the atomization method or the melt-crushing method or casting in a predetermined mold to form a rod shape or a plate shape.

In particular, the cobalt-based alloy powder produced by the atomization method can be applied to surface reforming construction such as PTA overlaying or thermal spraying by being adjusted to have a particle size suitable for the intended construction method. The overlay-welded rod produced by the continuous casting method can be applied to surface reforming construction such as gas overlaying. Also, by constructing this powder or rod material on an engine valve having various material qualities, an abrasion resistance can be imparted to the engine valve.

EXAMPLES

The alloys of the Examples of the present invention prepared and blended in the above-described manner and the alloys of the Comparative Examples were melted and subjected to measurement of the Charpy impact value and the Rockwell hardness by the methods described below, and an overlaying test and a thermal impact test were carried out by the methods described below.

(1) Charpy Impact Test;

By using an electric furnace, 100 g of an ingot having a blending composition of each alloy was heated to about 1600° C. and melted in a stream of argon, and was cast into a shell mold to be mechanically processed into test piece (without a notch) described in JIS Z 2242:2005. Then, by using a Charpy impact tester, an impact test was carried out in accordance with JIS Z 2242:2005, so as to measure the impact value.

(2) Hardness Measurement;

A cast piece melted by the same method as described in the above (1) was mechanically processed into a shape of 10×10× 20 mm to expose a parallel surface, and the top part of the parallel surface was subjected to wet polishing with a water-resistant abrasive paper of No. 240, so as to carry out a Rockwell hardness test in accordance with JIS Z 2245:2005. Here, the measurement was carried out in C scale.

(3) PTA Overlaying Test;

By using a high-frequency melting furnace, 100 kg of an ingot having a blending composition of each alloy was heated to about 1600° C. and melted in a stream of argon, and was pulverized by the gas atomization method, so as to adjust the particle size to 80 to 350 mesh by a vibration sieve. This alloy powder was subjected to plasma powder overlay welding on a face surface (the part shown by the reference sign 2 in FIG. 1) of an engine valve (umbrella diameter of about 70 mm, axial diameter of about 14 mm, and a total length of about 300 mm) fabricated by using a heat-resistant steel (SUH3) defined in JIS G 4311:1991, and the fluidity state of the molten pool formed at the time of overlay welding was examined. Here, the evaluation standard for the fluidity state is represented by any one of the following, and an alloy providing a good fluidity state is expressed as "Extremely good" or "Good".

(Evaluation Standard)

Extremely good: equivalent to or more than Comparative Examples P, Q (cobalt self-fluxing alloy)

Good: equivalent to or more than Comparative Example A (Stellite 6)

Slightly poor: poorer than Comparative Example A but better than Comparative Example F (Tribaloy 400)

Poor: equivalent to or less than Comparative Example F (4) Thermal Impact Test;

The engine valve fabricated by the same method as described in the above (3) was thermally treated for one hour in an electric furnace set at 400° C., and thereafter put into water of about 20° C. for quick quenching. Subsequently, the thermal treatment temperature is further raised by 50° C., so as to perform a thermal treatment for one hour and quenching with water. This is repeated until the thermal treatment temperature becomes 600° C., and whether cracks or exfoliation was generated or not after the thermal treatment at 600° C. was examined.

Table 1 shows the Examples of the present invention, and Table 2 and Table 3 show the Comparative Examples.

TABLE 1

| | No. | Composition (mass %) | | | | | | Impact value J/cm² | Hardness HRC | Overlay workability State of molten pool | Thermal impact test (600° C.→quenching with water) Presence or absence of cracks or exfoliation |
|---|---|---|---|---|---|---|---|---|---|---|---|
| | | Co | Mo | W | Cr | B | Others | | | | |
| Alloys of the present invention | 1 | 69.5 | 21.0 | — | 8.0 | 1.5 | — | 7 | 53.1 | Extremely good | none |
| | 2 | 59.5 | 19.0 | 10.0 | 10.0 | 1.5 | — | 5 | 61.2 | Extremely good | none |
| | 3 | 68.0 | — | 24.0 | 6.0 | 2.0 | — | 6 | 56.5 | Extremely good | none |
| | 4 | 59.7 | — | 21.0 | 18.0 | 1.3 | — | 6 | 54.6 | Extremely good | none |
| | 5 | 63.0 | 12.0 | 16.0 | 8.0 | 1.0 | — | 6 | 52.3 | Good | none |
| | 6 | 65.6 | 23.0 | — | 10.0 | 1.4 | — | 6 | 54.5 | Extremely good | none |
| | 7 | 63.5 | 25.0 | — | 10.0 | 1.5 | — | 6 | 55.0 | Extremely good | none |
| | 8 | 61.5 | 12.5 | 12.5 | 12.0 | 1.5 | — | 7 | 55.2 | Extremely good | none |
| | 9 | 61.7 | — | 27.0 | 10.0 | 1.3 | — | 8 | 53.8 | Extremely good | none |
| | 10 | 59.4 | — | 23.0 | 16.0 | 1.6 | — | 5 | 54.6 | Extremely good | none |
| | 11 | 67.2 | — | 22.0 | 9.0 | 1.8 | — | 5 | 54.1 | Extremely good | none |
| | 12 | 56.0 | 22.0 | — | 16.0 | 1.5 | 4.5Fe | 8 | 52.8 | Extremely good | none |
| | 13 | 59.2 | — | 25.0 | 10.0 | 1.3 | 3Ni, 1.5Cu | 9 | 52.3 | Extremely good | none |
| | 14 | 57.3 | 15.0 | 10.0 | 12.0 | 1.2 | 3Ni, 1.5Mn | 6 | 53.7 | Extremely good | none |
| | 15 | 67.0 | 23.0 | — | 8.0 | 1.2 | 0.8Si | 5 | 56.2 | Extremely good | none |
| | 16 | 58.7 | 12.0 | 12.0 | 16.0 | 1.1 | 0.2C | 5 | 54.3 | Good | none |
| | 17 | 60.0 | — | 26.0 | 10.0 | 1.5 | 2Cu, 0.5Si | 6 | 53.6 | Extremely good | none |
| | 18 | 55.4 | 15.0 | 10.0 | 15.0 | 1.5 | 3Fe, 0.1C | 5 | 55.3 | Extremely good | none |

TABLE 2

| | No. | Composition (mass %) | | | | | | Impact value J/cm² | Hardness HRC | Overlay workability State of molten pool | Thermal impact test (600° C.→quenching with water) Presence or absence of cracks or exfoliation |
|---|---|---|---|---|---|---|---|---|---|---|---|
| | | Co | Mo | W | Cr | B | Others | | | | |
| Comparative Examples | a | 71.4 | 21.0 | — | 6.0 | 1.6 | — | 8 | 50.4 | Extremely good | none |
| | b | 53.6 | 16.0 | 16.0 | 13.0 | 1.4 | — | 2 | 61.5 | Extremely good | present |
| | c | 65.2 | 18.0 | — | 15.0 | 1.8 | — | 4 | 56.7 | Extremely good | present |
| | d | 67.0 | 10.0 | 18.0 | 3.0 | 2.0 | — | 4 | 57.2 | Extremely good | present |
| | e | 55.5 | — | 23.0 | 20.0 | 1.5 | — | 3 | 58.0 | Extremely good | present |
| | f | 65.5 | 18.0 | — | 16.0 | 0.5 | — | 10 | 47.3 | Good | none |
| | g | 65.5 | 10.0 | 12.0 | 10.0 | 2.5 | — | 2 | 61.5 | Extremely good | present |
| | h | 55.7 | 23.0 | — | 12.0 | 1.3 | 4Fe, 4Ni | 9 | 49.8 | Extremely good | none |
| | i | 55.2 | 8.0 | 12.0 | 16.0 | 1.8 | 5Ni, 2Cu | 8 | 50.4 | Extremely good | none |
| | j | 63.3 | 24.0 | — | 8.0 | 1.2 | 1.5Si, 2Mn | 3 | 56.1 | Extremely good | present |
| | k | 58.4 | — | 22.0 | 18.0 | 1.1 | 0.5C | 2 | 59.6 | Good | present |

TABLE 3

| | No. | Composition (mass %) | | | | | | | | Impact value J/cm² | Hardness HRC | Overlay workability State of molten pool | Thermal impact test (600° C.→quenching with water) Presence or absence of cracks or exfoliation |
|---|---|---|---|---|---|---|---|---|---|---|---|---|---|
| | | Co | Mo | W | Cr | B | C | Si | Others | | | | |
| Comparative Examples | A | 65.7 | — | 4.6 | 28.5 | — | 1.2 | — | — | 14 | 43.3 | Good | none |
| | B | 60.0 | — | 8.5 | 30.0 | — | 1.5 | — | — | 6 | 48.4 | Good | present |
| | C | 60.49 | 8.5 | — | 29.0 | — | 2.0 | — | 0.01Mn | 7 | 48.2 | Slightly poor | present |
| | D | 64.5 | 4.5 | — | 29.0 | — | 1.25 | — | 0.55Mn, 0.2Ti | 15 | 42.1 | Poor | none |
| | E | 58.2 | 12.0 | — | 28.0 | — | 0.3 | — | 1.5Ni | 14 | 39.5 | Slightly poor | none |
| | F | 59.7 | 29.0 | — | 8.5 | — | — | 2.8 | — | 3 | 55.2 | Poor | present |
| | G | 59.5 | 22.0 | — | 17.0 | — | 0.2 | 1.3 | — | 4 | 49.2 | Slightly poor | present |

TABLE 3-continued

| No. | Composition (mass %) | | | | | | | Impact value J/cm² | Hardness HRC | Overlay workability State of molten pool | Thermal impact test (600° C.→quenching with water) Presence or absence of cracks or exfoliation |
|---|---|---|---|---|---|---|---|---|---|---|---|
| | Co | Mo | W | Cr | B | C | Si | Others | | | |
| H | 56.4 | 27.0 | — | 14.0 | — | — | 2.6 | — | 3 | 52.5 | Slightly poor | present |
| I | 60.32 | 28.5 | — | 8.5 | — | 0.08 | 2.6 | — | 2 | 51.6 | Slightly poor | present |
| J | 50.228 | 28.6 | — | 17.7 | 0.002 | 0.07 | 3.4 | — | 2 | 54.1 | Poor | present |
| K | 55.2 | 32.5 | — | 8.0 | — | 0.42 | 3.88 | — | 3 | 58.4 | Slightly poor | present |
| L | 59.23 | 28.7 | — | 9.3 | 0.02 | 0.19 | 2.56 | — | 4 | 51.9 | Poor | present |
| M | 38.68 | 40.1 | — | 19.1 | — | 0.02 | 2.1 | — | 1 | x | Poor | present |
| N | 59.46 | 33.7 | — | 5.3 | — | 0.04 | 1.5 | — | 3 | 56.2 | Slightly poor | present |
| O | 59.798 | 21.4 | — | 16.6 | — | 0.0023 | 2.2 | — | 5 | 49.6 | Slightly poor | none |
| P | 40.6 | 6.0 | — | 18.5 | 3.4 | — | 3.5 | 28Ni | 3 | 50.0 | Extremely good | present |
| Q | 66.8 | — | 8.0 | 20.0 | 2.7 | — | 2.5 | — | 4 | 57.0 | Extremely good | none |

※[x] shows that the measurement could not be achieved since the alloy was fragile.

The alloys (a) to (k) of the Comparative Examples shown in Table 2 are alloys having a composition outside of the scope of the claims of the present invention. In the alloy (a), Co exceeds the upper limit of the claims, in the alloy (h), the sum of Fe and Ni exceeds the upper limit of the claims, and in the alloy (i), the sum of Ni and Cu exceeds the upper limit of the claims respectively, and in the alloy (f), each of Mo and B is below the lower limit of the claims. In these cases, the hardness does not satisfy the target value. In the alloy (b), the sum of Mo and W exceeds the upper limit of the claims and Co is below the lower limit of the claims, in the alloy (c), Mo is below the lower limit of the claims, in the alloy (d), Cr is below the lower limit of the claims respectively. And, in the alloy (e), Cr exceeds the upper limit of the claims, in the alloy (g), B exceeds the upper limit of the claims, in the alloy (j), Si exceeds the upper limit of the claims, in the alloy (k), C exceeds the upper limit of the claims respectively. In these cases, the Charpy impact value is not satisfied in any of these. Further, in the Comparative Examples (b) to (e), (g), (j) and (k) in which the target of the Charpy impact value is not satisfied, generation of cracks was confirmed in the thermal impact test.

The alloys (A) to (Q) of the Comparative Examples shown in Table 3 are conventional Co—Cr—W—C type alloys (Stellite (registered trademark)), Co—Mo—Si type alloys (Tribaloy (registered trademark)), or alloys having a composition shown in other patent documents or self-fluxing alloy thermal spraying of JIS H 8303; however, none of these satisfies the target value of either the Charpy impact value or the hardness. Further, in the Comparative Examples (C) to (O), the overlay workability is poor. Also, in the Comparative Examples (B), (C), (F) to (N), and (P), generation of cracks was confirmed in the thermal impact test.

On the other hand, as shown in Table 1, the Examples 1 to 18 which are the alloys of the present invention satisfy the target values of all of the Charpy impact value, the Rockwell hardness, and the thermal impact test, and have a suitable hardness and a high abrasion resistance as a surface hardening material, and further are excellent in overlay workability.

INDUSTRIAL APPLICABILITY

As described above, the cobalt-based alloy provided by the present invention has excellent abrasion resistance and impact resistance properties as a surface hardening material, and also satisfies the fluidity property. Therefore, by forming such a material into a powder shape or a rod shape and performing surface hardening on various members by welding or thermal spraying, these members can be expected to enjoy a considerable improvement in durability.

Also, the cobalt-based alloy of the present invention is not limited to usage for filling, so that, by compositely adding this into a sintered component formed by powder metallurgy to form hard particles, this can be utilized also for forming a mechanical component having a good abrasion resistance.

DESCRIPTION OF REFERENCE SIGNS 1 engine valve
2 face surface (surface abutting against a sheet)

The invention claimed is:

1. A wear-resistant cobalt-based alloy for surface hardening of an engine valve, consisting of 21.0 to 25.0 mass % of Mo, 0.8 to 2.2 mass % of B, 5.0 to 18.0 mass % of Cr, and a remainder being 55.0 to 70.0 mass % of Co and unavoidable impurities, wherein the wear-resistant cobalt-based alloy has a Charpy impact value of 5 J/cm² or more and hardness of 52 HRC or more.

2. An engine valve filled or coated with a wear-resistant cobalt-based alloy, the wear-resistant cobalt-based alloy consisting of 21.0 to 25.0 mass % of Mo, 0.8 to 2.2 mass % of B, 5.0 to 18.0 mass % of Cr, and a remainder being 55.0 to 70.0 mass % of Co and unavoidable impurities, wherein the wear-resistant cobalt-based alloy has a Charpy impact value of 5 J/cm² or more and a hardness of 52 HRC or more.

3. The engine valve according to claim 2, wherein at least a face surface abutting against a sheet is filled or coated with said wear-resistant cobalt-based alloy.

4. The engine valve according to claim 2, wherein the engine valve is filled with the wear-resistant cobalt-based alloy.

5. An engine valve filled or coated with a wear-resistant cobalt-based alloy, the wear-resistant cobalt-based alloy consisting of 21.0 to 25.0 mass % of Mo, 0.8 to 2.2 mass % of B, 5.0 to 18.0 mass % of Cr, at least one selected from Fe, Ni, Mn, Cu and C, and a remainder being 55.0 to 70.0 mass % of Co and unavoidable impurities, wherein a sum of Fe, Ni, Mn, Cu and C is 5.0 mass % or less, a content of C is 0.3 mass % or less, and wherein the wear-resistant cobalt-based alloy has a Charpy impact value of 5 J/cm² or more and hardness of 52 HRC or more.

6. The engine valve according to claim 5, wherein at least a face surface abutting against a sheet is filled or coated with said wear-resistant cobalt-based alloy.

7. The engine valve according to claim 5, wherein the engine valve is filled with the wear-resistant cobalt-based alloy.

8. An engine valve filled or coated with a wear-resistant cobalt-based alloy, the wear-resistant cobalt-based alloy consisting of 21.0 to 27.0 mass % of W, 0.8 to 2.2 mass % of B, 5.0 to 18.0 mass % of Cr, and a remainder being 55.0 to 70.0 mass % of Co and unavoidable impurities, wherein the wear-resistant cobalt-based alloy has a Charpy impact value of 5 J/cm$^2$ or more and hardness of 52 HRC or more.

9. The engine valve according to claim 8, wherein at least a face surface abutting against a sheet is filled or coated with said wear-resistant cobalt-based alloy.

10. The engine valve according to claim 8, wherein the engine valve is filled with the wear-resistant cobalt-based alloy.

11. An engine valve filled or coated with a wear-resistant cobalt-based alloy, the wear-resistant cobalt-based alloy consisting of 21.0 to 27.0 mass % of W, 0.8 to 2.2 mass % of B, 5.0 to 18.0 mass % of Cr, at least one selected from Fe, Ni, Mn, Cu and C, and a remainder being 55.0 to 70.0 mass % of Co and unavoidable impurities, wherein a sum of Fe, Ni, Mn, Cu and C is 5.0 mass % or less, a content of C is 0.3 mass % or less, and wherein the wear-resistant cobalt-based alloy has a Charpy impact value of 5 J/cm$^2$ or more and hardness of 52 HRC or more.

12. The engine valve according to claim 11, wherein at least a face surface abutting against a sheet is filled or coated with said wear-resistant cobalt-based alloy.

13. The engine valve according to claim 11, wherein the engine valve is filled with the wear-resistant cobalt-based alloy.

* * * * *